United States Patent
Tafreshi et al.

(10) Patent No.: US 9,125,090 B2
(45) Date of Patent: Sep. 1, 2015

(54) STAGGERED CHANNELIZATION CODE ALLOCATION FOR MULTI-CARRIER NETWORKS

(75) Inventors: Fereidoun Tafreshi, Bellevue, WA (US); Arthur R. Brisebois, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 913 days.

(21) Appl. No.: 12/395,116

(22) Filed: Feb. 27, 2009

(65) Prior Publication Data
US 2010/0222071 A1 Sep. 2, 2010

(51) Int. Cl.
| | |
|---|---|
| H04W 4/00 | (2009.01) |
| H04W 28/08 | (2009.01) |
| H04W 72/04 | (2009.01) |
| H04W 72/06 | (2009.01) |

(52) U.S. Cl.
CPC .............. *H04W 28/08* (2013.01); *H04W 72/04* (2013.01); *H04W 72/06* (2013.01)

(58) Field of Classification Search
USPC ......... 370/320, 328, 332, 333, 437, 441, 479, 370/329; 455/447, 450, 451, 453, 513
See application file for complete search history.

(56) References Cited

U.S. PATENT DOCUMENTS

| | | | |
|---|---|---|---|
| 6,643,275 B1 | 11/2003 | Gustafsson et al. | |
| 6,944,473 B2 | 9/2005 | Irwin et al. | |
| 6,985,735 B2 | 1/2006 | Gustafsson | |
| 7,020,176 B2 | 3/2006 | Heo | |
| 7,197,318 B2 | 3/2007 | Schwarz et al. | |
| 7,373,151 B1 | 5/2008 | Ahmed | |
| 7,403,505 B2 | 7/2008 | Yoon et al. | |
| 8,208,421 B2* | 6/2012 | Dankberg et al. | ............. 370/316 |
| 8,208,446 B2* | 6/2012 | Von Elbwart et al. | ........ 370/335 |

(Continued)

FOREIGN PATENT DOCUMENTS

| | | |
|---|---|---|
| EP | 0723379 A2 | 7/1996 |
| WO | WO 02067463 A1 | 8/2002 |

(Continued)

OTHER PUBLICATIONS

Kashima, Tsuyoshi and Zhu, Houtao, "Load Balancing Effect of Inter-Frequency Handover with Pilot Power Tuning in UTRAN," IEEE White Paper, Jan. 2004, 5 pages.

(Continued)

*Primary Examiner* — Jenee Williams
(74) *Attorney, Agent, or Firm* — Abel Law Group, LLP

(57) ABSTRACT

In order to provide load balancing in a wireless network that includes a cell with two or more carriers, sequential service requests for radio resources are allocated to respective ones of the two or more carriers in a staggered manner (i.e., a round robin, or least recently used (LRU) approach). In an embodiment, the sequential requests are directed so as to allocate channelization codes of respective code trees associated with the two or more carriers substantially equally. The signal strength of a carrier may be checked prior to allocation. Trigger conditions may be checked prior to allocating a request to a carrier using the LRU approach. The trigger conditions may include power utilization of a first carrier compared to a second carrier, channelization code tree offset between two or more code trees respectively associated with the two or more carriers, and/or average bit rate per subscriber load of the carriers.

14 Claims, 4 Drawing Sheets

(56) References Cited

U.S. PATENT DOCUMENTS

| | | | |
|---|---|---|---|
| 2002/0122403 A1* | 9/2002 | Hashem et al. .............. 370/342 |
| 2003/0021245 A1* | 1/2003 | Haumonte et al. ........... 370/330 |
| 2003/0050015 A1* | 3/2003 | Kelly et al. ................. 455/67.4 |
| 2003/0099249 A1* | 5/2003 | Heijenk ........................ 370/412 |
| 2004/0028054 A1* | 2/2004 | Khurana et al. ......... 370/395.21 |
| 2004/0067756 A1* | 4/2004 | Wager et al. ................. 455/450 |
| 2004/0081112 A1* | 4/2004 | Chen et al. ................... 370/335 |
| 2004/0125768 A1* | 7/2004 | Yoon et al. ................... 370/331 |
| 2005/0074007 A1* | 4/2005 | Samuels et al. .............. 370/392 |
| 2005/0233753 A1* | 10/2005 | Hamabe et al. ........... 455/452.1 |
| 2006/0013182 A1* | 1/2006 | Balasubramanian et al. 370/343 |
| 2006/0034219 A1* | 2/2006 | Gu et al. ...................... 370/329 |
| 2006/0056373 A1* | 3/2006 | Legg ............................. 370/341 |
| 2006/0067269 A1* | 3/2006 | Jugl et al. ..................... 370/329 |
| 2006/0088049 A1* | 4/2006 | Kastein et al. ............... 370/462 |
| 2006/0120321 A1* | 6/2006 | Gerkis et al. ................. 370/329 |
| 2006/0146755 A1* | 7/2006 | Pan et al. ...................... 370/334 |
| 2006/0182063 A1* | 8/2006 | Ma et al. ....................... 370/331 |
| 2006/0198338 A1* | 9/2006 | Ishii et al. ..................... 370/329 |
| 2006/0203723 A1* | 9/2006 | Shirakabe et al. ............ 370/229 |
| 2006/0270414 A1* | 11/2006 | Veerasamy et al. ........ 455/452.1 |
| 2006/0285504 A1* | 12/2006 | Dong et al. ................... 370/254 |
| 2007/0008934 A1* | 1/2007 | Balasubramanian et al. 370/335 |
| 2007/0025382 A1* | 2/2007 | Jones et al. ................... 370/431 |
| 2007/0053336 A1 | 3/2007 | Petrovic et al. |
| 2007/0091801 A1* | 4/2007 | Shahidi et al. ................ 370/230 |
| 2007/0171808 A1* | 7/2007 | Wu et al. ...................... 370/208 |
| 2007/0230412 A1* | 10/2007 | McBeath et al. ............. 370/338 |
| 2007/0297381 A1* | 12/2007 | Oketani et al. ................ 370/338 |
| 2008/0117864 A1* | 5/2008 | Wu et al. ...................... 370/329 |
| 2008/0186961 A1* | 8/2008 | Yun et al. ...................... 370/360 |
| 2009/0040936 A1* | 2/2009 | Wu et al. ...................... 370/252 |
| 2009/0069020 A1* | 3/2009 | Wang et al. ................... 455/446 |
| 2009/0103475 A1* | 4/2009 | Katis et al. ................... 370/328 |
| 2009/0117909 A1* | 5/2009 | Kim et al. ..................... 455/442 |
| 2009/0232112 A1* | 9/2009 | Trainin et al. ................. 370/329 |
| 2009/0296622 A1* | 12/2009 | Pisut et al. .................... 370/312 |

FOREIGN PATENT DOCUMENTS

| | | |
|---|---|---|
| WO | WO02082704 A1 | 10/2002 |
| WO | WO03103324 A1 | 12/2003 |
| WO | 2004038954 A2 | 5/2004 |
| WO | WO2008059994 A1 | 5/2008 |

OTHER PUBLICATIONS

International Search Report and Written Opinion mailed Jun. 28, 2010 in App. No. PCT/US2010/025559, 8 pages.

* cited by examiner

STAGGERED CHANNELIZATION CODE ALLOCATION FOR MULTI-CARRIER NETWORKS

BACKGROUND

1. Field of the Invention

This invention relates to wireless networks and more particularly to load balancing in wireless networks.

2. Description of the Related Art

In a code division multiple access (CDMA) network, as the load increases, the effective radio access bearer (RAB) coverage becomes smaller due to increases in noise (i.e., interference). The use of multiple carrier frequencies within a particular cell increases the number of users that the particular cell can support. Currently, in order to offload a carrier, one solution used by network operators is called Inter-Frequency Load Sharing, which is based on a power leveling-out approach. The approach diverts incoming traffic in a cell from a more loaded carrier to a less loaded carrier based on power. Once a first carrier reaches a threshold loading, based on power measurements by nodeB, the second carrier is then used. NodeB is a term used in UMTS (Universal Mobile Telecommunications System) for what was commonly referred to as the base transceiver station (BTS) in GSM networks. Thus, nodeB is the network node controlled by the radio network controller (RNC) that communicates over an air interface with user equipment (UE). As shown in FIG. 1, when the first carrier is reaching its capacity limits, the first carrier (which is on a different frequency than the second carrier) has a smaller effective traffic area 101 and may provide poorer quality as compared to the second carrier, which is very lightly loaded (or not loaded at all) and has a larger effective traffic area 103.

SUMMARY

In order to provide a more balanced solution to managing multi-carrier cells, in an embodiment, a method is provided for load balancing in a wireless network that includes a cell with two or more carriers. The method includes directing sequential requests for radio resources during respective call set ups to respective ones of the two or more carriers in a staggered manner (i.e., a round robin, or least recently used (LRU) approach). In an embodiment, the sequential requests are directed so as to allocate channelization codes of respective code trees associated with the two or more carriers substantially equally. The method may further include checking a signal strength of a particular one of the two or more carriers before a request for radio resources is allocated to the particular one of the carriers. The method may further include checking for a trigger condition prior to allocating the sequential requests for radio resources during respective call setups to respective ones of the two or more carriers. The trigger conditions may include power utilization of a first carrier compared to a second carrier, channelization code tree offset between two or more code trees respectively associated with the two or more carriers, and/or average bit rate per subscriber load of the carriers.

In another embodiment, a method is provided for load balancing in a wireless network that includes a multi-carrier cell. The method includes receiving service requests from mobile devices in the cell. During call setup associated with each of the service requests, a respective one of two or more carriers is assigned, if other conditions are satisfied, to each of the service requests in a staggered manner to thereby ensure that allocation to the two or more carriers remains substantially equal. The other conditions include a signal strength of one or more of the carriers and presence of a trigger condition.

In another embodiment, a radio network controller (RNC) for controlling a multi-carrier cell in a wireless network is provided. The RNC includes a radio resource control entity responsive to requests for radio resources from mobile devices in the multi-carrier cell to allocate respective carriers to the requests in a round robin manner if one or more other conditions are met.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
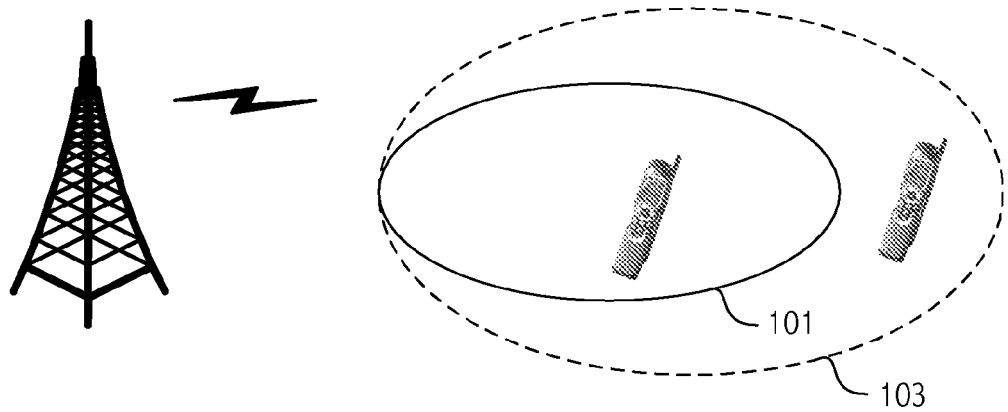
FIG. 1 illustrates a communication network in which a first carrier has a smaller traffic area than a second carrier due to loading on the first carrier.
Figure 2:
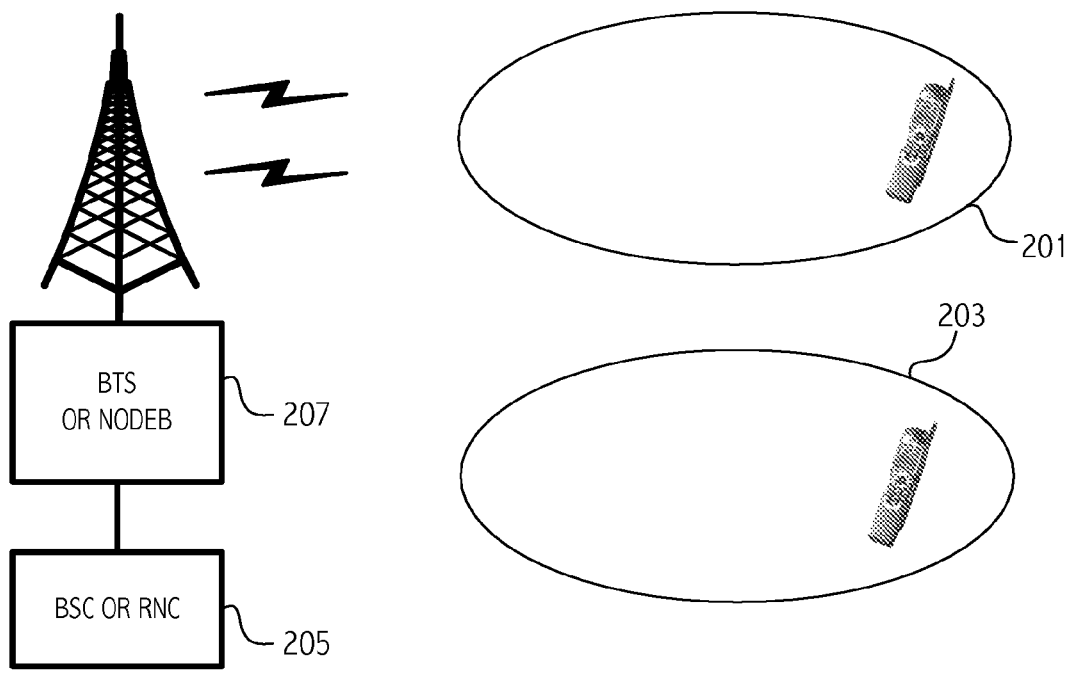
FIG. 2 illustrates equal loading of a first carrier and a second carrier according to an embodiment of the invention.
Figure 3:
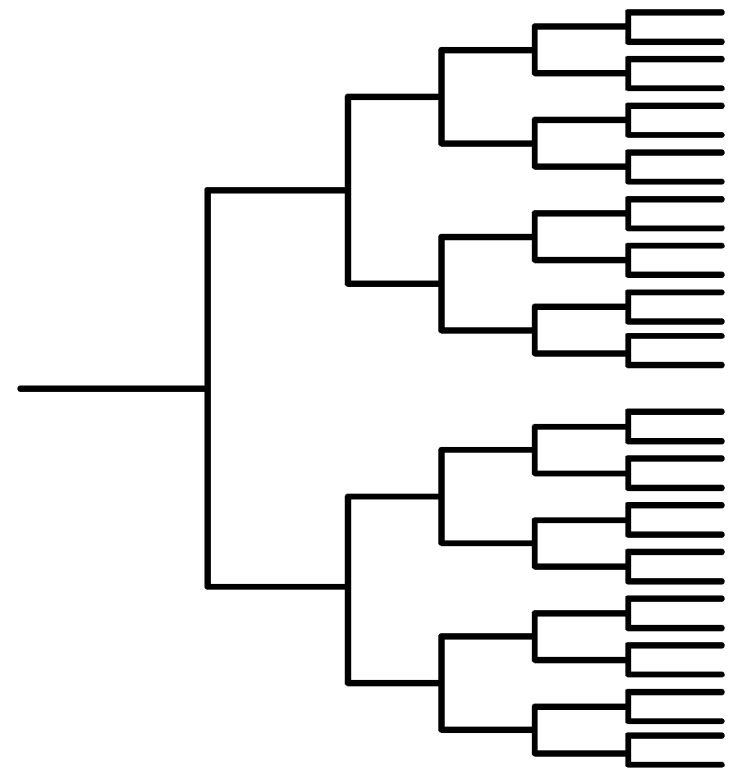
FIG. 3 illustrates a code tree that may be utilized for each carrier in a multi-carrier cell.

As the load on a CDMA network increases, including wideband CDMA (WCDMA) networks, one of the technical solutions network operators choose to implement to ease the traffic loads is to deploy a second carrier on another frequency. As the first carrier becomes congested, traffic is transferred to the second carrier. In order to avoid over utilization (or under utilization) of the carriers available in a multi-carrier cell, as shown in FIG. 1, according to an embodiment of the invention, each of the carrier's traffic is leveled out between the multiple carriers, resulting in substantially equal effective coverage areas 201 and 203 for the two carrier frequencies, as shown in FIG. 2. Note that in FIG. 2, the traffic areas 201 and 203 are shown as separate for ease of presentation, although they typically substantially overlap. Assume for ease of discussion there are two carriers in the cell. In an embodiment, the traffic between the two carriers is leveled out by means of "dynamic channelization code allocation." Thus, the traffic is redirected to each carrier in a staggered or alternating way so that the allocations in the code trees are filled in as equally as possible. FIG. 3 illustrates an exemplary code tree that would be allocated by each of the carriers. That is, the RAB requests are directed to each carrier in a staggered way, i.e., a first request to one carrier and a second request to the second carrier, and so on, in a round robin or least recently used (LRU) carrier approach. That is, the least recently allocated carrier is the next one to be allocated. Further, the code trees for each carrier are allocated so as to keep the code trees balanced. The Inter-Frequency Load Sharing approach described earlier does not take the channelization codes into account. Nor do previous approaches attempt to maintain equally loaded carriers, thereby avoiding potential poor quality on the heavily loaded carrier.

Figure 4:
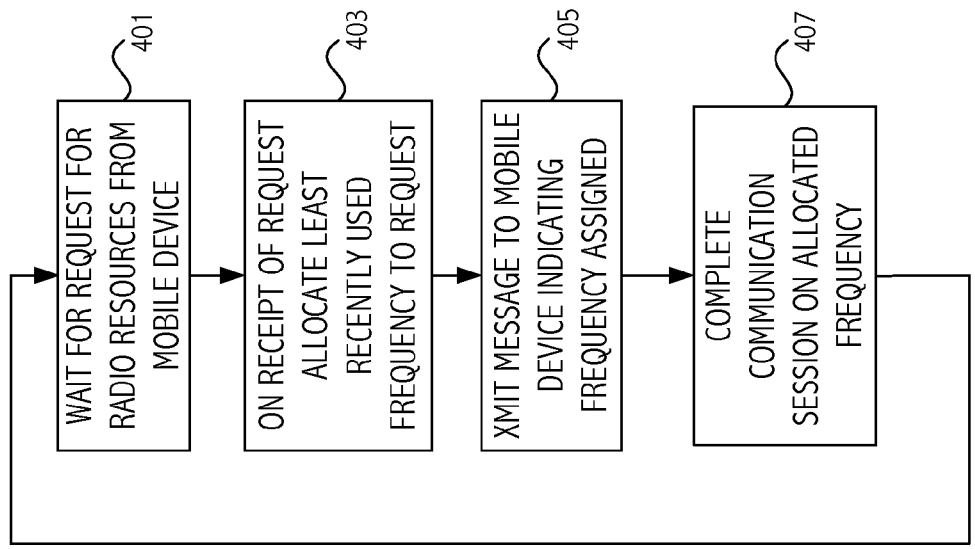
FIG. 4 illustrates a flow diagram of carrier allocation according to an embodiment of the invention.

Referring to FIG. 4, illustrated is a flow diagram illustrating an embodiment of the invention. The functionality described in FIG. 4 may be located in the base station controller (BSC) or RNC 205 (see FIG. 2), which includes conventional BSC equipment to effectuate the approaches described herein, including processor(s), storage for control software, communication interfaces, etc. Note that the terms RNC and BSC are used interchangeably herein to describe radio network control functionality. In addition, the functionality or some portion thereof may be located in nodeB (or the base transceiver station (BTS)) 207, or in a separate network entity not shown, which is coupled to the BSC 205 or the BTS 207, or both. For ease of discussion, the assumption will be that the BSC or radio network controller (RNC) implements the flow illustrated in FIG. 4.

Assume the cell controlled by the RNC includes two carriers at different frequencies. Other embodiments may, of course, incorporate more than two carrier frequencies. The RNC waits for a request for radio resources in 401. On receipt of a request for radio resources associated with a call setup for an originating or terminating call in the cell in 403, the RNC allocates traffic between the carriers so that the code trees are filled in a staggered manner. That is, by assigning the request to the different carriers in a round robin or least recently used approach in 403, not only are the loads kept balanced between the carriers, avoiding a very heavily loaded and a very lightly loaded carrier, but also the channelization codes of carriers can be kept substantially balanced. That is, the codes are allocated from the code trees so that the code tree allocations are substantially the same between the carriers. In 405 the network transmits a message to the mobile device indicating the frequency that has been assigned to the session, and in 407, the communication session is completed on the assigned frequency. The approach described in FIG. 4 helps make the radio-bearer-effective-areas of the different carriers as equal as possible and provides better quality in what was previously the heavily loaded carrier. In this way, the network operators avoid having one carrier with bad quality due to heavy loading and another one that has good quality as it is lightly loaded. Thus, an embodiment of the invention avoids load imbalances between carriers and keeps the RAB coverage areas of the carriers as equal as possible and provides balance between code trees associated with the different frequencies. Higher throughput to customers located at the cell edges may be obtained along with increased traffic.

While the approach described in FIG. 4 may be adequate for some cells with multiple frequencies, there are circumstances in which the two different carrier frequency bands (e.g., 850 MHZ and 1900 MHz) provide different coverage capability within the cell. Therefore, one carrier may provide better coverage due to its propagation characteristics, and that carrier would have a larger service area as compared to the other carrier even with equal loading. Thus, it may be advantageous to verify coverage of the particular carrier before allocating the carrier to the request.

Figure 5:
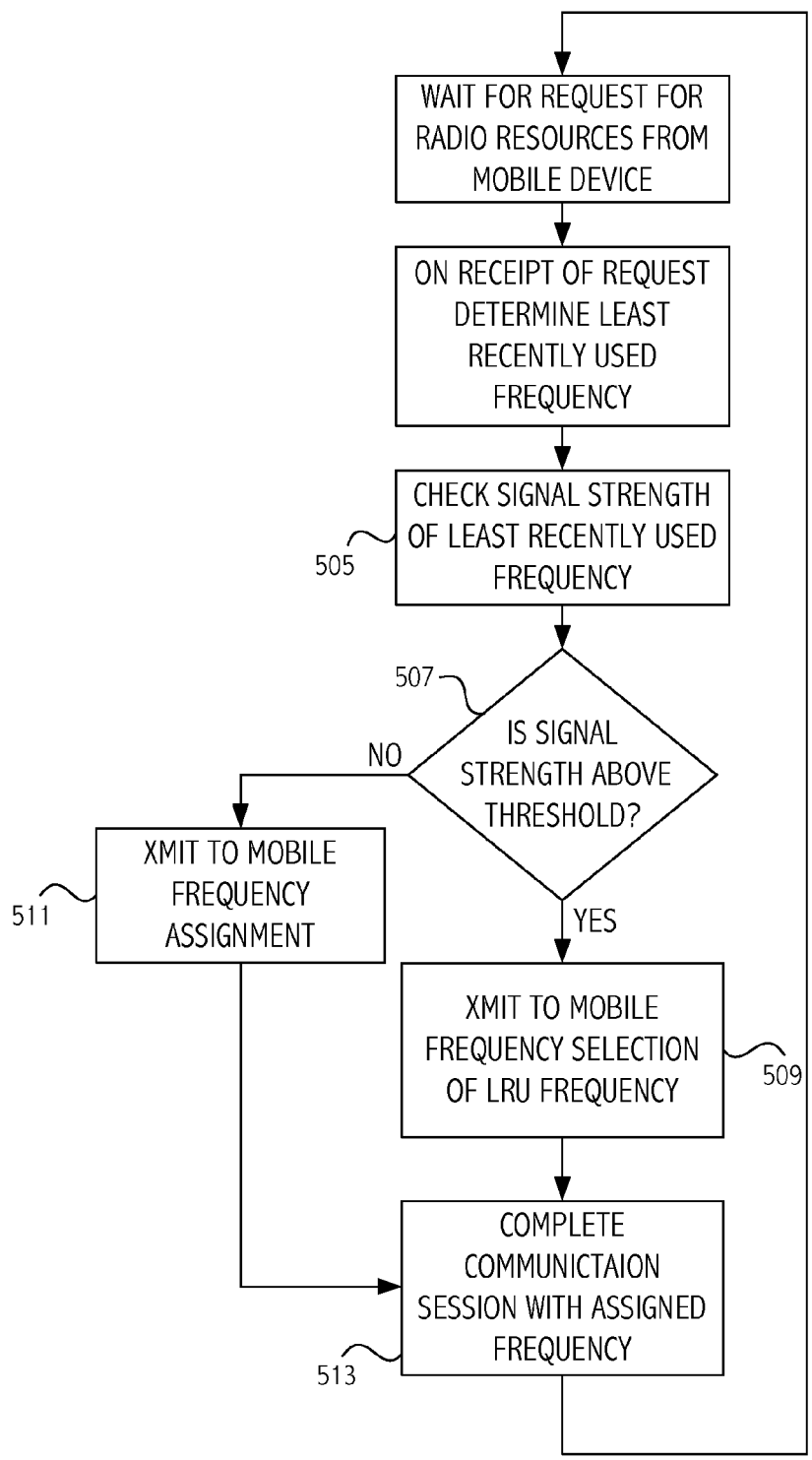
FIG. 5 illustrates a flow diagram of an embodiment of carrier allocation in which signal strength is checked prior to allocating a carrier to a radio resource request.

Assume a call setup occurs and the mobile device is located at the cell edge which is adequately covered by the first carrier but is poorly covered by the second carrier due to its propagation characteristics. If the call is simply switched to the second carrier because it is the second carrier's turn according to the round robin scheme, the call may be subject to a poor quality connection and there is a risk that the call will be dropped. In order to avoid such situations, referring to FIG. 5, a check is made on the signal strength of the second carrier in 505 prior to allocating the carrier and code. That is, the signal strength is checked prior to allocation of the call to the second carrier frequency. If the signal strength is above a threshold in 507, the call may be allocated to the second carrier, and the mobile device is notified on 409. If on the other hand, the signal strength is below a threshold, then the RNC should avoid allocating the call to the second carrier and the first carrier is allocated to the call. The carrier assignment may be transmitted to the mobile device in 511. In 513, the call is completed on whatever carrier is assigned to the communication session. The particular signal strength threshold may be determined by the network operator and may be defined, e.g., as a certain dB value below (i.e., in comparison to) the first carrier's signal level.

Allocating resource requests among different carriers as described herein can result in a large number of redirects to a different carrier frequency. That is, the mobile device has to be told to switch to a different carrier frequency. Assume that the mobile device defaults to operating on a first carrier frequency. If half of the calls are to be allocated to the second carrier, that results in a large number of redirects. The required signaling to effectuate the redirect, or confirm that the mobile device should utilize the default frequency, at every call setup, can impose a significant load on both on signaling requirements between the RNC and the mobile device and on processor load within the RNC to determine the appropriate carrier for each call.

Figure 6:
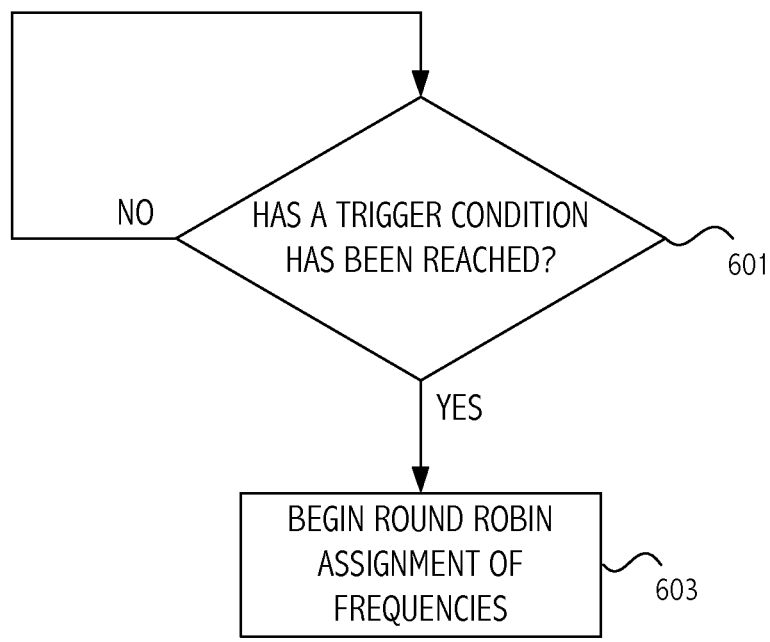
FIG. 6 illustrates a flow diagram of an embodiment in which one or more trigger points are checked prior to implementing staggered code allocation.

Thus, in an embodiment, it may be desirable to incorporate need based triggering points into the determination of whether to stagger resource requests in a round robin or LRU manner. In order to avoid unnecessary redirect loading of the system, checks can be made on overall load of the carriers so that the round robin approach is used only when needed. Referring to FIG. 6, these checks 601 function as trigger points to start the round robin carrier allocation in 603. No round robin allocation of carriers would be allowed before the trigger points have been met. In an embodiment, the mobile device initiates communication on a default frequency and stays with that frequency unless signaling from the RNC indicates a change in carrier frequency is required. These trigger points or checks can include one or more of the following. The power utilization of the first carrier can be compared to the second carrier. When the difference in power reaches a predetermined level, staggered (i.e., round robin) carrier allocation begins. In addition, channelization code tree utilization offset between the two code trees can be used as a trigger point. Further, the average bit rate per subscriber load of the carriers (i.e., indicating that one of the carriers is in over-utilization), can be used as a trigger point.

While the above description has focused on mobile originated or terminated calls in the network, similar considerations apply to service requests resulting from handovers for calls from a neighboring cell. That is, the same criteria may be utilized to determine the appropriate carrier for the call being handed over in order to achieve balancing between the carriers as the criteria described above for mobile originated and terminated calls within the particular cell. Thus, a round robin approach may be utilized to allocate carriers to service requests resulting from handovers.

In addition to the criteria described above for when to utilize the round robin approach to allocation of carrier frequencies to service requests, the speed of the mobile device and Quality of Service (QOS) can also be used to determine if an allocation of a different carrier should be made to the particular mobile device. For example, a voice over internet protocol (VOIP) device traveling at a high speed, e.g., in an automobile, is preferably left on an 850 MHz carrier to avoid unnecessary inter-frequency handovers and relatively poor fading performance of a 1900 MHz carrier.

The description of the invention set forth herein is illustrative, and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method for load balancing in a wireless network including a cell having two or more carrier frequencies, comprising:
   receiving service requests from mobile devices in the cell;
   assigning during call setup for each of the service requests, if one or more trigger conditions are satisfied, a respective one of the two or more carrier frequencies to respective service requests in a round robin manner;
   determining whether at least one of the one or more trigger conditions are satisfied according to a difference in power between the two or more carrier frequencies reaching a predetermined level; and
   if the one or more trigger conditions are not satisfied for a call corresponding to a first service request of the service requests initiated on a first of the carrier frequencies, continuing the call on the first of the carrier frequencies until the call is complete;
   and if the one or more trigger conditions are satisfied for the call corresponding to the first service request on the first of the carrier frequencies, assigning the call to a second of the carrier frequencies in the round robin manner and the second of the carrier frequencies instead of the first of the carrier frequencies is used to complete the call.

2. The method as recited in claim 1 wherein the service requests are directed so as to allocate channelization codes of respective code trees associated with the two or more carrier frequencies equally.

3. The method as recited in claim 1 further comprising checking a signal strength of a particular one of the two or more carrier frequencies before a request for radio resources is directed to the particular one of the carrier frequencies.

4. The method as recited in claim 1 further comprising determining if an additional trigger condition exists based on channelization code tree offset between two or more code trees respectively associated with the two or more carrier frequencies.

5. The method as recited in claim 1 further comprising determining if an additional trigger condition exists based on average bit rate per subscriber load of the carrier frequencies.

6. The method as recited in claim 1 wherein the service requests are associated with call setups for originating and terminating calls in the cell.

7. The method as recited in claim 1 wherein the service requests are associated with at least one of call setup for a mobile originated or terminated call in the cell and a handoff of a call from a neighboring cell.

8. A network controller for controlling a multi-carrier cell having two or more carrier frequencies in a wireless network comprising:
   a radio resource controller including one or more processors, storage for control software and control software stored in the storage:
   the radio resource controller responsive to sequential service requests from respective mobile devices for radio resources in the multi-carrier cell to allocate respective ones of the carrier frequencies to the sequential service requests in a round robin manner if one or more trigger conditions are satisfied;
   wherein the one or more processors are configured to execute the control software to:
   make a determination as to whether at least one of the one or more trigger conditions are satisfied according to a difference in power between the two or more carrier frequencies reaching a predetermined level;
   wherein if the one or more trigger conditions are not satisfied for a call corresponding to a first service request of the service requests initiated on a first of the carrier frequencies, the radio resource controller is responsive to continue the call on the first of the carrier frequencies until the call is complete; and
   wherein if the one or more trigger conditions are satisfied for the call corresponding to the first service request on the first of the carrier frequencies, the radio resource controller is responsive to assign the call to a second of the carrier frequencies in the round robin manner and the second of the carrier frequencies instead of the first of the carrier frequencies is used to complete the call.

9. The network controller as recited in claim 8 wherein the respective carrier frequencies are allocated to allocate channelization codes of respective code trees associated with the two or more carrier frequencies equally.

10. The network controller as recited in claim 8 wherein another of the one or more trigger conditions is whether a signal strength of a carrier frequency to which one of the service requests is being allocated is above a threshold.

11. The network controller as recited in claim 8 wherein another of the one or more trigger conditions is determined according to channelization code tree offset between two or more code trees respectively associated with the two or more carrier frequencies.

12. The network controller as recited in claim 8 wherein another of the one or more trigger conditions is determined according to average bit rate per subscriber load of the carrier frequencies.

13. The network controller as recited in claim 8 wherein respective ones of the service requests are associated with call setups for mobile originated or terminated calls in the cell.

14. The network controller as recited in claim 8 wherein respective ones of the service requests are associated with handoffs of calls from neighboring cells.

* * * * *